US008185895B2

(12) United States Patent
Ko et al.

(10) Patent No.: US 8,185,895 B2
(45) Date of Patent: May 22, 2012

(54) METHOD, APPARATUS AND PROGRAM STORAGE DEVICE FOR PROVIDING AN ANCHOR POINTER IN AN OPERATING SYSTEM CONTEXT STRUCTURE FOR IMPROVING THE EFFICIENCY OF ACCESSING THREAD SPECIFIC DATA

(75) Inventors: Wenjeng Ko, Tucson, AZ (US); William G. Sherman, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1352 days.

(21) Appl. No.: 11/289,903

(22) Filed: Nov. 30, 2005

(65) Prior Publication Data

US 2007/0124729 A1    May 31, 2007

(51) Int. Cl.
G06F 9/46 (2006.01)
G06F 13/00 (2006.01)
G06F 9/26 (2006.01)
H04L 29/06 (2006.01)

(52) U.S. Cl. ........ 718/100; 718/107; 718/108; 711/154; 711/163; 711/203; 711/220; 713/164

(58) Field of Classification Search .............. 718/100, 718/107, 108; 711/154, 163, 203, 220; 713/164
See application file for complete search history.

(56) References Cited

U.S. PATENT DOCUMENTS

| 6,542,919 | B1 | 4/2003 | Wendorf et al. |
| 6,792,559 | B1 | 9/2004 | Cohen et al. |
| 6,915,408 | B2 | 7/2005 | Huras |
| 7,689,971 | B2 * | 3/2010 | Peng et al. ........ 717/120 |
| 2003/0135789 | A1 | 7/2003 | DeWitt, Jr. et al. |
| 2003/0221085 | A1 * | 11/2003 | Huras ........ 711/220 |
| 2004/0060049 | A1 * | 3/2004 | Mendoza et al. ...... 718/100 |
| 2004/0268172 | A1 * | 12/2004 | Kates et al. ........ 713/400 |
| 2005/0066332 | A1 * | 3/2005 | Durai ............. 718/108 |
| 2005/0125795 | A1 | 6/2005 | Kissell |
| 2005/0210454 | A1 | 9/2005 | DeWitt, Jr. et al. |

FOREIGN PATENT DOCUMENTS

WO    WO01/61471 A3    8/2001

OTHER PUBLICATIONS

US 6,065,019 (Ault, et al.); May 16, 2000 col. 1 line 58-col. 2, line 32, col. 7, line 5, col. 10, line 7.
EP 0817044A (Sun Microsystems, Inc.) Jan. 7, 1998, p. 2, line 28; p. 3, line 3; p. 4, lines 5-19; p. 4, line 55; p. 5, line 7.
Larson "Memory allocation for long-running server applications"; ISM ;98 Int'l Symposium on Memory Management, Vancouver BC Canada; vol. 34, No. 3, pp. 176-185 Xp002192295.
Haggander, et al., "Optimizing dynamic memory management in a multithreaded application executing on a multiprocessor" Parallel Processisng, 1998 Proceedings. 1998 Int'l Conf.
Nguyen, Thread Specific Storage Across Platform Unix/NT/OS2/Linux.

* cited by examiner

*Primary Examiner* — Kenneth Tang
(74) *Attorney, Agent, or Firm* — Griffiths & Seaton PLLC

(57) ABSTRACT

A method, apparatus and program storage device for providing an anchor pointer in an operating system context structure for improving the efficiency of accessing thread specific data is provided. A kernel thread context structure is maintained in memory. A thread accesses a pointer memory in the kernel thread context structure and sets a value within the pointer memory that addresses data specific to the thread.

13 Claims, 5 Drawing Sheets

METHOD, APPARATUS AND PROGRAM STORAGE DEVICE FOR PROVIDING AN ANCHOR POINTER IN AN OPERATING SYSTEM CONTEXT STRUCTURE FOR IMPROVING THE EFFICIENCY OF ACCESSING THREAD SPECIFIC DATA

BACKGROUND OF THE INVENTION

1. Field of the Invention

This invention relates in general to computer operating systems, and more particularly to a method, apparatus and program storage device for providing an anchor pointer in an operating system context structure for improving the efficiency of accessing thread specific data.

2. Description of Related Art

In any operating system that supports protection and security, protection boundaries separate user processes from each other, and from the operating system (OS) kernel. Generally, there are two protection domains in the operating system: the user protection domain and the kernel mode protection domain. Application programs run in the user protection domain. The user protection domain provides read and write access to the data region of the process, read access to the text and shared text regions of the process and access to shared data regions using the shared memory functions. When a program is running in the user protection domain, the processor executes instructions in the problem state, and the program does not have direct access to kernel data.

The code in the kernel and kernel extensions run in the kernel protection domain. This code includes interrupt handlers, kernel processes, device drivers, system calls, and file system code. The processor is in the kernel protection domain when it executes instructions in the privileged state. The privileged state provides read and write access to the global kernel address space and read and write access to the thread, except when an interrupt handler is running.

Code running in the kernel protection domain can affect the execution environments of all processes. Code running in the kernel protection domain can access global system data, can use all kernel services and is exempt from all security constraints. Thus, programming errors in the code running in the kernel protection domain can cause the operating system to fail. In particular, a process's user data cannot be accessed directly, but must normally be accessed using the kernel services, or their variants. These routines protect the kernel from improperly supplied user data addresses. Application programs can gain controlled access to kernel data by making system calls. The use of a system call by a user-mode process allows a kernel function to be called from the user mode. Access to functions that directly or indirectly invoke system calls is typically provided by programming libraries, providing access to operating system functions.

A user process includes a set of system resources for executing one or more "threads". A thread is a simple execution path through application software and the operating system. Stated differently, a thread is a separate sequential flow of control that takes place during the execution of a data processing program or application. A thread may also be described as the active execution of a designated data processing routine, including any nested routine invocations. Kernels or kernel threads are control flows that enable concurrent processing of a procedure by a plurality of processors thereby dividing a task to be performed into parts and decreasing the task execution time. Multi-threading can be used in single processor systems to perform several tasks at the same time such as input monitoring and computation execution. Multi-threading can also be used in multi-processor systems to perform several control flows or threads in parallel.

For a multithreaded application, it is very common to have identical code running on multiple threads. Part of the process of multithreaded application design is to determine where data access conflicts between multiple threads can potentially lead to data corruption and how to avoid such conflicts. Most solutions to multithreading problems deal with synchronization concepts, such as how to serialize threads that share common data. This focus on synchronization occurs because synchronization is an indispensable part of multithreaded programming. Moreover, each thread might still need to access and maintain data that is specific to that particular thread. For example, a thread's current state, which is represented by a current program counter, a call/return stack, the processor's registers, and some thread-specific data, allows the processor to freeze a thread (i.e., stop executing it) and to continue execution at a later time from the point where the thread was stopped.

All threads within a process share system resources and operate in the same address space. Static variables declared within a computer program have a static storage location. Accordingly, references to a static variable from any thread will refer to the memory location allocated to that variable. Multiple copies of static variables location are not created as they may be with other variables types. The value of a static variable will always be the last value written to its memory. One of the primary advantages of static variables is that their values persist between references, and will exist for as long as the program operates. In a multi-threaded program, static variables allow a thread to resume execution of its instructions and access data it was using before it relinquished control of the CPU to another thread.

One of the primary difficulties that result from using static variables in multi-threaded computer programs is that changes to a static variable made by one thread will be seen by all other threads operating within the same process. Multiple threads cannot use static variables separately because other threads within the process can overwrite the values stored at the variable memory location. Thus, the development of multi-threaded programs using static variables often requires explicit thread harmonization by the programmer. Another problem is that threads within the same process must use unique static variable IDs to avoid reading or writing to the location of another static variable. This also requires thread harmonization by the programmer. Since, identical code is running on each thread of a multithreaded process, remapping of some thread specific data, e.g., thread ID, etc., from the operating system to the address of a thread specific save area is typically required. However, this is inefficient because system resources are tied-up during the remapping process.

It can be seen then that there is a need for a method, apparatus and program storage device for providing an anchor pointer in an operating system context structure for improving the efficiency of accessing thread specific data.

SUMMARY OF THE INVENTION

To overcome the limitations in the prior art described above, and to overcome other limitations that will become apparent upon reading and understanding the present specification, the present invention discloses method, apparatus and program storage device for providing an anchor pointer in an operating system context structure for improving the efficiency of accessing thread specific data.

The present invention solves the above-described problems by providing a kernel thread context structure in memory. A thread accesses a pointer memory in the kernel thread context structure and sets a value within the pointer memory that addresses data specific to the thread.

A memory in accordance with an embodiment of the present invention includes a kernel thread context structure and a pointer memory maintained by a thread in the kernel thread context structure; wherein the pointer memory includes a value set by the thread for referencing an application thread specific structure associated with the thread. A processor may be provided that includes a processor having a user mode and a protected kernel mode. The memory may be coupled to the processor for providing a user mode stack and a kernel mode stack. Program code may be executed in the processor to provide the kernel thread context structure and maintain the pointer memory within the kernel thread context structure for referencing an application thread specific structure.

In other embodiments of the present invention, a program storage device is provided. The program storage device includes program instructions executable by a processing device to perform operations for providing an anchor pointer in an operating system context structure for improving the efficiency of accessing thread specific data. The operations include executing at least one thread on a processor, maintaining a kernel thread context structure in memory having a pointer memory, enabling a thread to access the pointer memory in the kernel thread context structure and setting a value within the pointer memory for referencing an application thread specific structure associated with the thread. A method for providing an anchor pointer in an operating system context structure for improving the efficiency of accessing thread specific data is also provided in another embodiment of the present invention.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides method, apparatus and program storage device for providing an anchor pointer in an operating system context structure for improving the efficiency of accessing thread specific data. A kernel thread context structure is provided in memory. A thread accesses a pointer memory in the kernel thread context structure and sets a value within the pointer memory that addresses data specific to the thread. Thus, the thread may access data that is specific to the thread.

Figure 1:
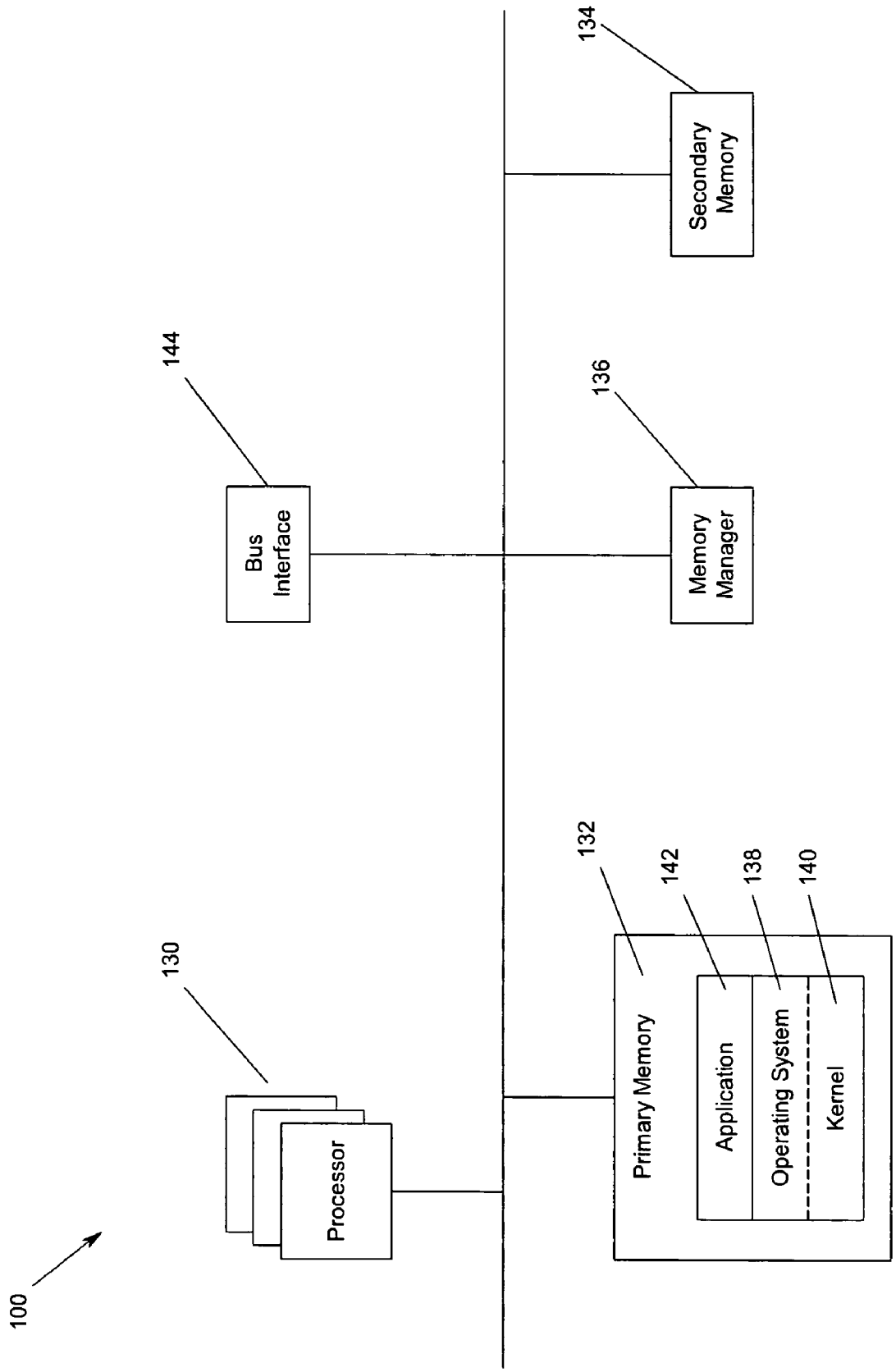
FIG. 1 illustrates a block diagram of a computer system according to an embodiment of the present invention.

FIG. 1 illustrates a block diagram of a computer system 100 according to an embodiment of the present invention. In FIG. 1, the computer system 100 includes one or more processors 130, which are each capable of executing a thread within one of a number of concurrent multithreaded processes. As is typical in multitasking data processing systems, each user process may be allocated its own virtual memory space, which may be mapped partially into a high-speed primary memory 132 and partially into a lower speed secondary memory 134 by memory manager 136.

The computer system 100 and the allocation of system resources to the computer system 100 are controlled by operating system 138. For the purpose of the present discussion, it is assumed that operating system 138 is resident within primary memory 132, although those skilled in the art will appreciate that certain infrequently utilized segments of operating system 138 may be swapped out to secondary memory 134 by memory manager 136. Operating system 138 includes kernel 140, which comprises the lowest layer of operating system 138 that interacts most directly with the computer system 100. Kernel 140 dispatches kernel threads to processors 130 for execution, provides services to device drivers interfacing with hardware within computer system 100, and implements system services, memory management, network access, and the file system utilized by computer system 100. In addition to kernel 140, primary memory 132 also stores frequently utilized segments of application software 142. As is well-known to those skilled in the art, application software 142 communicates with operating system 138 through an Application Programming Interface (API).

Computer system 100 also includes bus interface 144 through which multiple nodes can interface to system resources available within computer system 100. As will be appreciated by those skilled in the art, computer system 100 may also include additional hardware coupled to system bus 146 that is not necessary for an understanding of the present invention and is accordingly omitted for simplicity.

Figure 2:
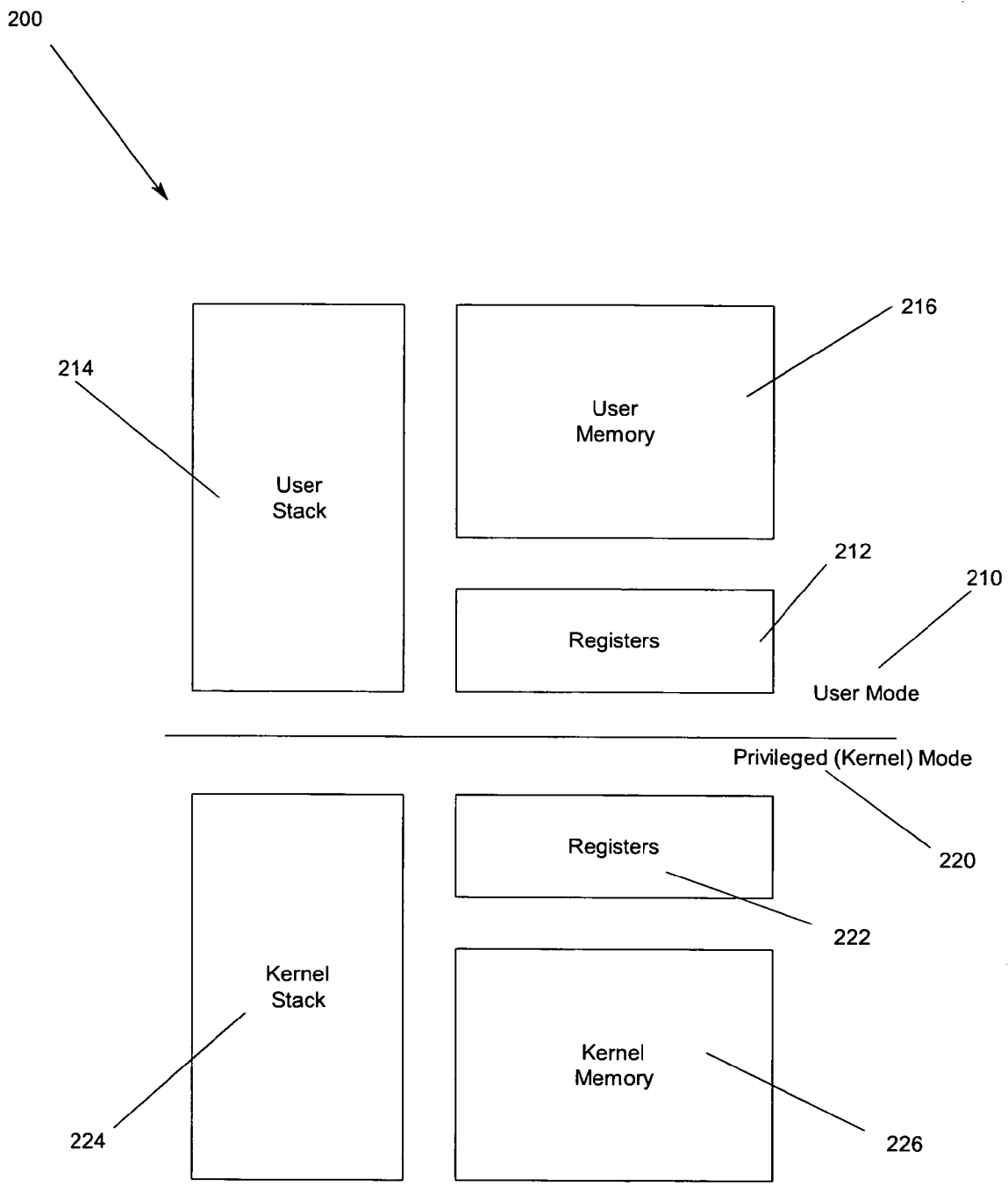
FIG. 2 shows the user mode and kernel mode states according to an embodiment of the present invention.

FIG. 2 shows the user mode and kernel mode states 200 according to an embodiment of the present invention. In FIG. 2, a user mode 210 and kernel mode 220 are shown. Applications and subsystems run on the computer in user mode 210. Processes that run in user mode 210 do so within their own virtual address spaces. They are restricted from gaining direct access to many parts of the system, including system hardware, memory not allocated for user mode 210, and other portions of the system that might compromise system integrity.

Processes that run in kernel-mode 220 can directly access system data and hardware, and are not restricted like processing running in user-mode 210. Performance-sensitive drivers and services run in kernel mode 220 to interact with hardware more efficiently. All components for processes running in kernel-mode 220 are fully protected from applications running in user mode 210. Processes that run in user mode 210 are effectively isolated from processes running in kernel-mode 220 and other processes running in user-mode 210.

In FIG. 2, a thread for a process running in user mode 210 is characterized as having its own context including registers 212 and memory stack 214. A user stack 214 is a data structure that includes a series of memory locations and a pointer to the initial location. All processors provide instructions for placing and retrieving values to and from the stack 214. The user memory 216 is a block of memory that is dedicated to the use of a current process running in user mode 210. A complete user state of a thread is maintained in user registers 212.

The kernel operates in its own protected address space and includes its own registers 222 and kernel stack 224. The kernel maintains the integrity of its own data structures and that of other processes. The kernel stack 224 includes information used by the kernel. Kernel memory 226 is generally shared by all processes, but is only accessible in kernel mode 220. Context switches from one task to another happen on the kernel stack 214 of the current process.

Figure 3:
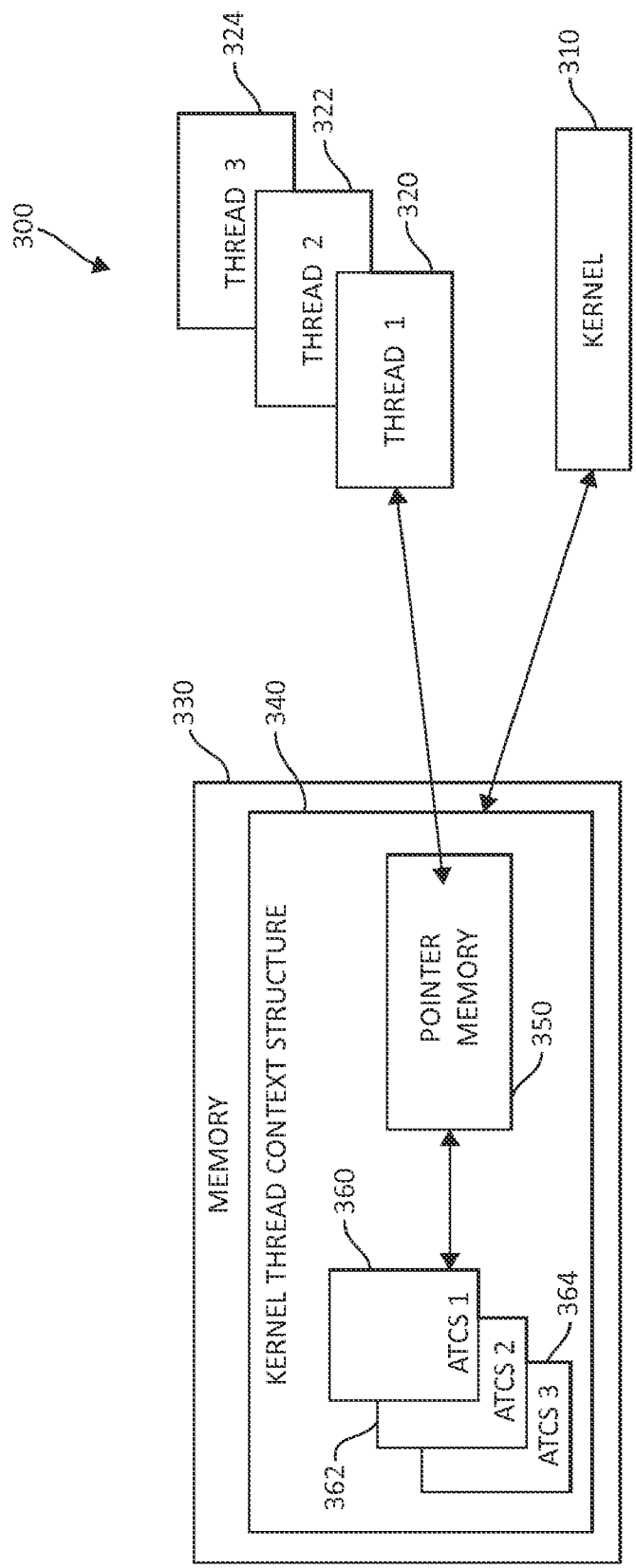
FIG. 3 illustrates a block diagram of a system providing an anchor pointer in an operating system context structure for improving the efficiency of accessing thread specific data according to an embodiment of the present invention.

FIG. 3 illustrates a block diagram of a system 300 providing an anchor pointer in an operating system context structure for improving the efficiency of accessing thread specific data according to an embodiment of the present invention. In FIG. 3, a kernel 310 and a plurality of threads 320-324 are shown. For a multi-threaded application, it is very common to have identical code running on multiple threads. However, each thread might still need to access and maintain data that is specific to that particular thread. A thread may also be referred to as a lightweight process since a thread is similar to a real process, i.e., a thread and a running program are both a single sequential flow of control. However, a thread is considered lightweight because it runs within the context of a full-blown program and takes advantage of the resources allocated for that program and the program's environment As a sequential flow of control, a thread must carve out some of its own resources within a running program, i.e., the thread must have its own execution stack and program counter for example. The code running within the thread works only within that context.

Memory 330 is provided for maintaining registers, stacks and other data storage space. Within memory 330 a kernel thread context structure 340 is provided. Windows 2000, Windows XP and Linux use kernel level threads. With kernel level threads, the kernel maintains context information for the process and the threads. Scheduling is done on a thread basis. A thread 320 may readily access the kernel thread context structure 340. A pointer memory 350 is provided within kernel thread context structure 340.

According to an embodiment of the present invention, pointer memory 350 is reserved inside the kernel thread context structure 340. Kernel thread context structure 340 contains the values of the hardware registers, the stacks, and the thread's private storage areas. In practice, application code cannot have a reserved register. Thus, pointer memory 350 is reserved in kernel thread specific structure 340 so that an application can have an efficient way to reference the application thread specific structure (ATSS) 360-364 in kernel thread context structure 340. The pointer memory 350 allows the thread 320 to save and retrieve the value stored in the pointer memory 350. Saving and retrieving of the pointer by a thread will be very efficient because kernel thread context structure 340 is readily accessible within the operating system work area.

Figure 4:
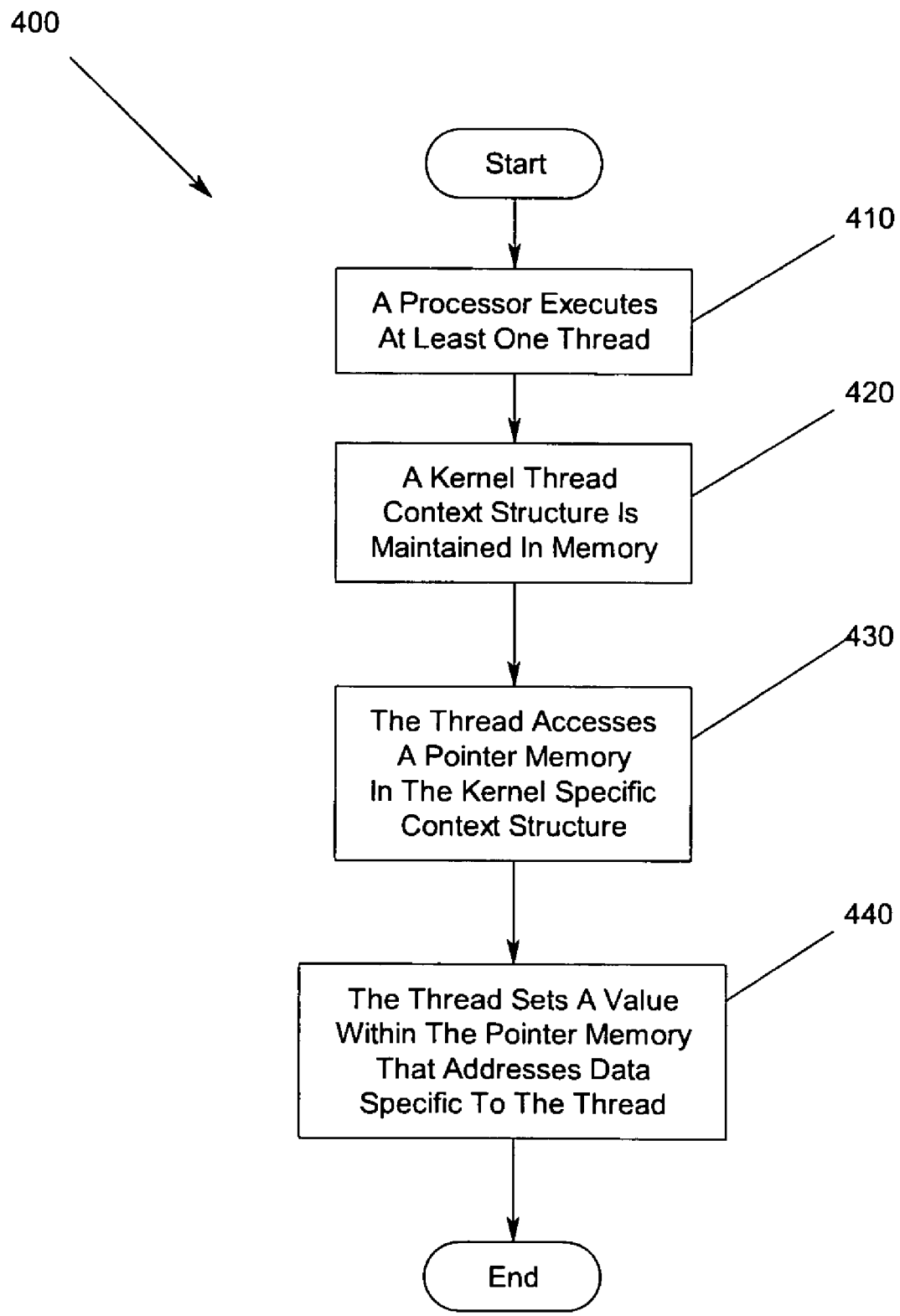
FIG. 4 is a flow chart of the method for providing an anchor pointer in an operating system context structure for improving the efficiency of accessing thread specific data according to an embodiment of the present invention.

FIG. 4 is a flow chart 400 of the method for providing an anchor pointer in an operating system context structure for improving the efficiency of accessing thread specific data according to an embodiment of the present invention. In FIG. 4, a processor is executing at least one thread 410. A kernel thread context structure is maintained in memory 420. The thread accesses a pointer memory in the kernel thread context structure 430. The thread sets a value within the pointer memory that addresses data specific to the thread 440. The location of the thread specific data may be changed. The thread will then make a corresponding change to the value stored in the pointer memory.

Figure 5:
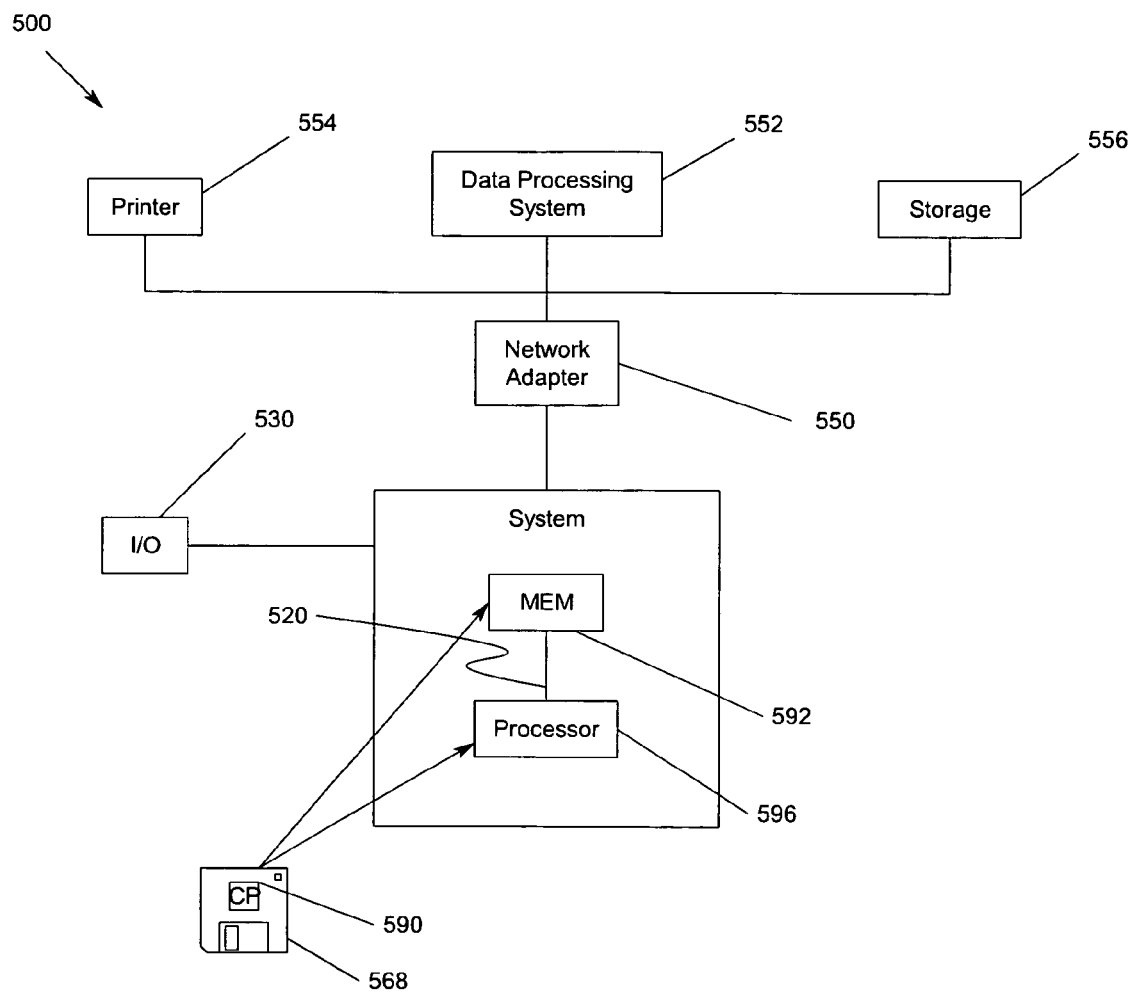
FIG. 5 illustrates a system according to an embodiment of the present invention.

FIG. 5 illustrates a system 500 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 590 accessible from a computer-usable or computer-readable medium 568 providing program code for use by or in connection with a computer or any instruction execution system.

For the purposes of this description, a computer-usable or computer readable medium 568 can be any apparatus that can contain, store, communicate, propagate, or transport the program for use by or in connection with the instruction execution system, apparatus, or device. The medium 568 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor 596 coupled directly or indirectly to memory elements 592 through a system bus 520. The memory elements 592 can include local memory employed during actual execution of the program code, bulk storage, and cache memories which provide temporary storage of at least some program code in order to reduce the number of times code must be retrieved from bulk storage during execution.

Input/output or I/O devices 540 (including but not limited to keyboards, displays, pointing devices, etc.) can be coupled to the system either directly to the system or through intervening I/O controllers.

Network adapters 550 may also be coupled to the system to enable the system to become coupled to other data processing systems 552, remote printers 554 or storage devices 556 through intervening private or public networks 560. Modems, cable modem and Ethernet cards are just a few of the currently available types of network adapters.

Accordingly, the computer program 590 comprise instructions which, when read and executed by the system 500 of FIG. 5, causes the system 500 to perform the steps necessary to execute the steps or elements of the present invention The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer system, comprising:
a processor configured to execute a plurality of threads in a user mode and operate in a protected kernel mode, each thread configured to execute a same code;
a user memory coupled to the processor;
a kernel memory, coupled to the processor, for providing a kernel mode stack, a kernel mode register, and a kernel mode memory;
first program code executing in the processor for providing a first kernel thread context structure in the kernel memory and for maintaining a first pointer memory within the first kernel thread context structure for a first thread; and
second program code executing in the processor for providing a second kernel thread context structure in the kernel memory and for maintaining a second pointer memory within the second kernel thread context structure for a second thread, wherein:
the first kernel thread context structure is configured to store a first address value, the first address value stored in the first kernel thread context structure in the kernel memory and associated with a first location in the user memory specific to the first thread for the same code to form a first application thread specific structure for the first thread,
the first pointer memory enables the first thread to retrieve the first address value,
the second kernel thread context structure is configured to store a second address value, the second address value stored in the second kernel thread context structure in the kernel memory and associated with a second location in the user memory specific to the second thread for the same code to form a second application thread specific structure for the second thread,
the second pointer memory enables the second thread to retrieve the second address value, and
the first address value and the second address value are set by the user mode.

2. The computer system of claim 1, wherein the first pointer memory addresses the first address value specific to the first thread and the second pointer memory addresses the second address value specific to the second thread.

3. The computer system of claim 1, wherein the first address value is a first static address value set by the first thread and the second address value is a second address value set by the second thread.

4. The computer system of claim 3, wherein the first address value is changed by the first thread to reflect a change in a first memory address in the user memory for the first application thread specific structure and the second address value is changed by the second thread to reflect a change in a second memory address in the user memory for the second application thread specific structure.

5. A system, comprising:
a processor; and
a physical kernel memory coupled to the processor, the kernel memory comprising:
a plurality of kernel thread context structures associated with a respective thread operating in a user mode, each thread executing a same code; and
a pointer memory maintained by each kernel thread context structure; wherein:
each kernel thread context structure is configured to store an address value, each address value stored in the kernel memory and associated with a location in a user memory specific to each respective thread for the same code to form an application thread specific structure associated with each respective thread, and each pointer memory enables each thread to retrieve the address value stored in its respective application thread specific structure, and each address value is set by the user mode.

6. The system of claim 5, wherein each pointer memory addresses data specific to its respective thread.

7. The system of claim 5, wherein each address value is changed by a respective thread to reflect a change in the location for each application thread specific structure.

8. A program storage device, comprising:
program instructions executable by a processing device to perform operations for providing a pointer in an operating system context structure for improving the efficiency of accessing thread specific data, the operations comprising:
executing a plurality of threads in a user mode on a processor, the plurality of threads executing a same code;
maintaining a kernel thread context structure for each respective thread in a kernel memory coupled to the processor, each kernel thread context structure comprising a pointer memory;
enabling each thread in the plurality of threads to access the pointer memory in its respective kernel thread context structure;
setting an address value in each kernel thread context structure in the kernel memory, each address value associated with a location in a user memory specific to a particular thread for the same code to form a respective application thread specific structure within each pointer memory for each respective thread, and
retrieving, by each thread, the address value stored in its respective application thread specific structure during execution, wherein the address value is set and utilized by the user mode.

9. The program storage device of claim 8, wherein setting the address value within each respective pointer memory comprises setting each address value to reflect a change in a memory address in the user memory for each application thread specific structure.

10. The program storage device of claim 8, wherein maintaining each kernel thread context structure in the kernel memory comprises maintaining in each kernel thread context structure a respective pointer memory for each thread being executed.

11. A method for providing an anchor pointer in an operating system context structure for improving the efficiency of accessing thread specific data, comprising:
executing a plurality of threads in user mode on a processor, the plurality of threads executing a same code;
maintaining a kernel thread context structure in a kernel memory for each respective thread, each kernel thread context structure comprising a pointer memory;
enabling each thread in the plurality of threads to access the pointer memory in its respective kernel thread context structure;
setting an address value within each pointer memory for each respective thread, each address value stored in its respective kernel thread context structure in the kernel memory and associated with a location in a user memory specific to each thread for the same code and forming an application thread specific structure for each respective thread; and
retrieving, by each respective thread, the address value stored in its respective application thread specific structure during execution, wherein the address value is set and utilized by the user mode.

12. The method of claim 11, wherein setting the value within each pointer memory comprises setting each value in each pointer memory to reflect a change in a memory address in the user memory for the application thread specific structure.

13. The method of claim 11, wherein maintaining each kernel thread context structure in the kernel memory comprises maintaining in each kernel thread context structure a respective pointer memory for each thread being executed.

* * * * *